(12) United States Patent
Arvind et al.

(10) Patent No.: US 12,330,313 B2
(45) Date of Patent: Jun. 17, 2025

(54) GUIDED TRAVEL MODE WITH DYNAMIC FORCE FEEDBACK FOR MOBILE ROBOTS

(71) Applicant: ZEBRA TECHNOLOGIES CORPORATION, Lincolnshire, IL (US)

(72) Inventors: Achal Dasa Arvind, Santa Clara, CA (US); Benjamin Narin, Lincolnshire, IL (US); Melonee Wise, San Jose, CA (US); Derek King, Seattle, WA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 321 days.

(21) Appl. No.: 17/970,333

(22) Filed: Oct. 20, 2022

(65) Prior Publication Data
US 2024/0131709 A1 Apr. 25, 2024
US 2024/0227187 A9 Jul. 11, 2024

(51) Int. Cl.
*B25J 9/16* (2006.01)

(52) U.S. Cl.
CPC ........... *B25J 9/1666* (2013.01); *B25J 9/1694* (2013.01)

(58) Field of Classification Search
CPC ............ G05D 3/12; G05D 2201/0216; B60W 2300/40; B60W 60/001
See application file for complete search history.

(56) References Cited

U.S. PATENT DOCUMENTS

| | | | | |
|---|---|---|---|---|
| 2002/0158599 | A1* | 10/2002 | Fujita | G10L 15/26 704/E15.045 |
| 2015/0197012 | A1* | 7/2015 | Schnittman | G05D 1/0272 700/250 |
| 2018/0352735 | A1* | 12/2018 | Balutis | G05D 1/0016 |
| 2021/0147202 | A1* | 5/2021 | Black | G05D 1/0212 |

* cited by examiner

*Primary Examiner* — Jaime Figueroa
*Assistant Examiner* — Jerrod Irvin Davis (57) ABSTRACT

A mobile robot includes: a chassis supporting a locomotive assembly; a sensor; a processor configured, in a guided travel mode, to: detect an external force applied to the chassis in a first direction; control the sensor to capture sensor data corresponding to a physical environment of the mobile robot; detect, based on the sensor data, an operational constraint in the physical environment; determine, based on the detected operational constraint, a feedback force in a second direction opposite the first direction; and controlling the locomotive assembly according to the feedback force.

20 Claims, 7 Drawing Sheets

GUIDED TRAVEL MODE WITH DYNAMIC FORCE FEEDBACK FOR MOBILE ROBOTS

BACKGROUND

Autonomous or semi-autonomous mobile robots can be deployed in facilities such as warehouses, manufacturing facilities, healthcare facilities, or the like, e.g., to transport items within the relevant facility. Such robots may occasionally require assistance by human operators in the facility, e.g., to move a stuck robot, or the like. Manual movement of the robots by operators, however, may be impeded by the dimensions, shape, and/or weight of the robots.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile robot including: a chassis supporting a locomotive assembly; a sensor; a processor configured, in a guided travel mode, to: detect an external force applied to the chassis in a first direction; control the sensor to capture sensor data; detect, based on the sensor data, an operational constraint; determine, based on the detected operational constraint, a control parameter for generating a feedback force in a second direction opposite the first direction; and controlling the locomotive assembly according to the control parameter.

Additional examples disclosed herein are directed to a method including: detecting an external force applied to a chassis of a mobile robot in a first direction; controlling a sensor of the mobile robot to capture sensor data; detecting, based on the sensor data, an operational constraint; determining, based on the detected operational constraint, a control parameter for generating a feedback force in a second direction opposite the first direction; and controlling a locomotive assembly of the mobile robot according to the control parameter.

Figure 1:
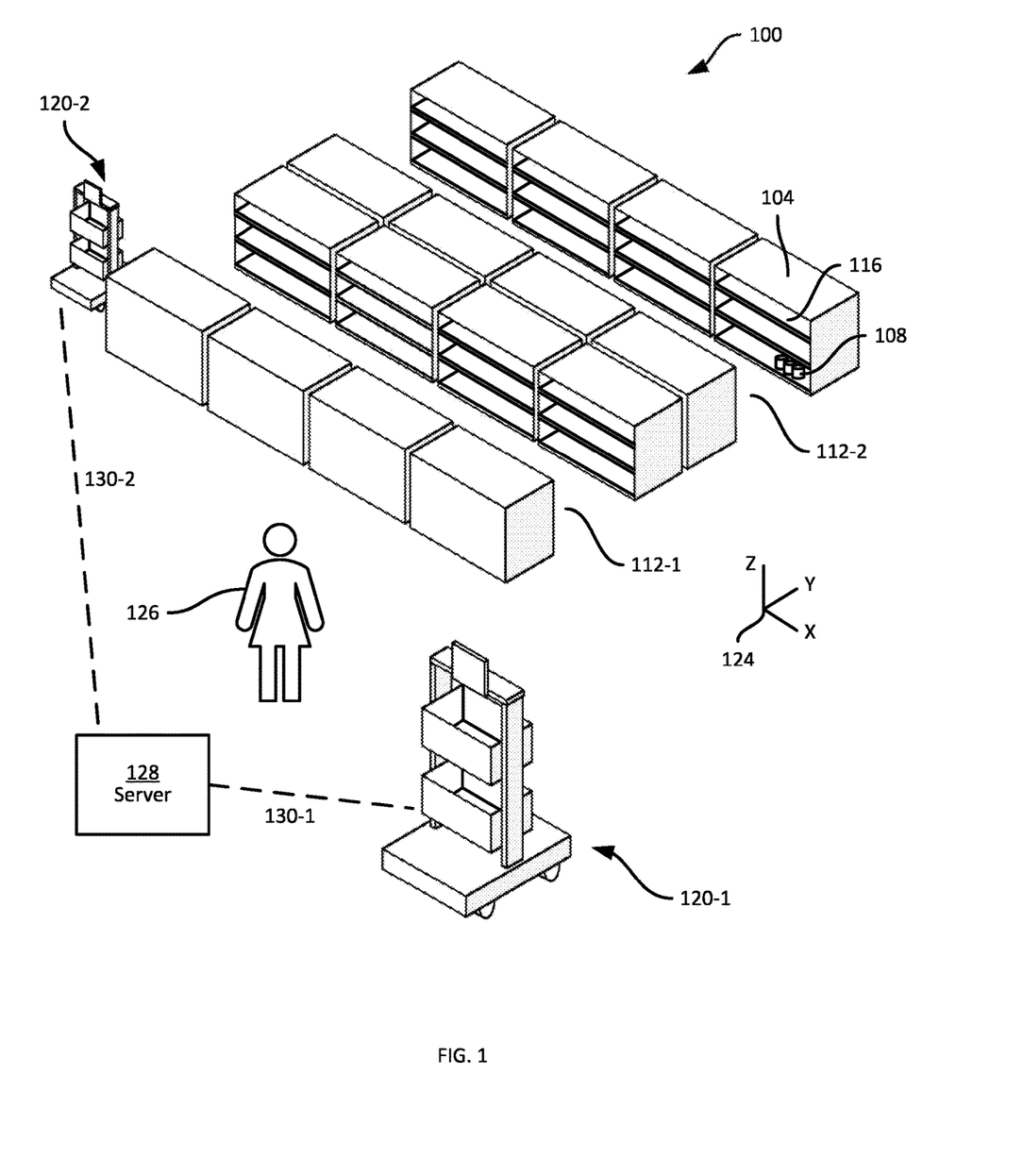
FIG. 1 is a diagram of item-handing mobile robots deployed in a facility.

FIG. 1 illustrates an interior of a facility 100, such as a warehouse, a manufacturing facility, a healthcare facility, or the like. The facility 100 includes a plurality of support structures 104 carrying items 108. In the illustrated example, the support structures 104 include shelf modules, e.g., arranged in sets forming aisles 112-1 and 112-2 (collectively referred to as aisles 112, and generically referred to as an aisle 112; similar nomenclature is used herein for other components). As shown in FIG. 1, support structures 104 in the form of shelf modules include support surfaces 116 supporting the items 108. The support structures 104 can also include pegboards, bins, or the like, in other examples.

In other examples, the facility 100 can include fewer aisles 112 than shown, or more aisles 112 than shown in FIG. 1. The aisle 112, in the illustrated example, are formed by sets of eight support structures 104 (four on each side). The facility can also have a wide variety of other aisle layouts, however. As will be apparent, each aisle 112 is a space open at the ends, and bounded on either side by a support structure 104. The aisle 112 can be travelled by humans, vehicles, and the like. In still further examples, the facility 100 need not include aisles 112, and can instead include assembly lines, or the like.

The items 108 may be handled according to a wide variety of processes, depending on the nature of the facility. In some examples, the facility is a shipping facility, distribution facility, or the like, and the items 108 can be placed on the support structures 104 for storage, and subsequently retrieved for shipping from the facility. Placement and/or retrieval of the items 108 to and/or from the support structures can be performed or assisted by mobile robots, of which two example robots 120-1 and 120-2 are shown in FIG. 1. A greater number of robots 120 can be deployed in the facility 100 than the two robots 120 shown in FIG. 1, for example based on the size and/or layout of the facility 100. Components of the robots 120 are discussed below in greater detail. In general, each robot 120 is configured to transport items 108 within the facility 100.

Each robot 120 can be configured to track its pose (e.g., location and orientation) within the facility 100, e.g., within a coordinate system 124 previously established in the facility 100. The robots 120 can navigate autonomously within the facility 100, e.g., travelling to locations assigned to the robots 120 to receive and/or deposit items 108. The items 108 can be deposited into or onto the robots 120, and removed from the robots 120, by one or more human workers 126 and/or mechanized equipment such as robotic arms and the like deployed in the facility 100. The locations to which each robot 120 navigates can be assigned to the robots 120 by a central server 128. That is, the server 128 is configured to assign tasks to the robots 120. Each task can include either or both of one or more locations to travel to, and one or more actions to perform at those locations. For example, the server 128 can assign a task to the robot 120-1 to travel to a location defined in the coordinate system 124, and to await the receipt of one or more items 108 at that location.

Tasks can be assigned to the robots via the exchange of messages between the server 128 and the robots 120, e.g., over a suitable combination of local and wide-area network, including communications links 130-1 and 130-2. The server 128 can be deployed at the facility 100, or remotely from the facility 100. In some examples, the server 128 is configured to assign tasks to robots 120 at multiple facilities, and need not be physically located in any of the individual facilities.

Although the robots 120 can be configured to navigate the facility 100 autonomously, under some conditions a robot 120 may be unable to continue autonomous navigation. For example, a robot 120 may become mislocalized, in that the tracked pose maintained by that robot 120 does not reflect the true pose of the robot 120 in the facility 100. In some cases, a robot 120 may relocalize itself by continuing to travel through the facility 100 and identify structures with locations stored in a map accessible to the robot 120. In other cases, however, a robot 120 may fail to relocalize, and enter an error state.

In further examples, robots 120 can enter an error state when unable to generate a viable navigational path. For example, a robot 120 may travel into a tight space (e.g., a corner, narrow aisle 112, or the like), with insufficient space for the robot 120 to turn around an exit. In still further examples, a robot 120 can enter an error state in response to detecting an onboard hardware and/or software failure.

When a robot 120 enters an error state, the robot 120 can be configured to cease autonomous navigation, and await assistance, e.g., by a worker 126. The worker 126 can, for example, physical manipulate the robot 120 to move the robot 120 out of a small space or other obstruction, to move the robot 120 to a maintenance area of the facility 100, or the like. The robots 120 have locomotive assemblies including wheels, tracks, or the like, and can therefore be pushed along a floor of the facility 100 by the worker 126. However, the weight of a robot 120, and/or internal resistance to movement (e.g., due to friction in locomotive components of the robot 120 at rest) may impede pushing of the robot 120. Further, the size and/or shape of the robots 120 may obstruct the field of view of the worker 126 while pushing a robot 120, such that the worker 126 may inadvertently push the robot 120 into an obstacle.

The robots 120 are therefore configured, as discussed below, to implement a guided travel mode. Upon entering the guided travel mode (e.g., after entering an error state), a robot 120 ceases autonomous navigation, but can continue capturing sensor data and detecting objects in its vicinity. Using the sensor data, the robot 120 can control its locomotive assembly to assist or resist movement of the robot 120 initiated by the worker 126, in order to provide a defined level of force feedback to the worker 126 while the worker 126 pushes the robot 120. Further, the robot 120 can be configured to dynamically adjust the level of force feedback substantially in real time, e.g., based on the proximity of obstacles in the vicinity of the robot 120 (which may be obscured from the view of the worker 126).

Figure 2:
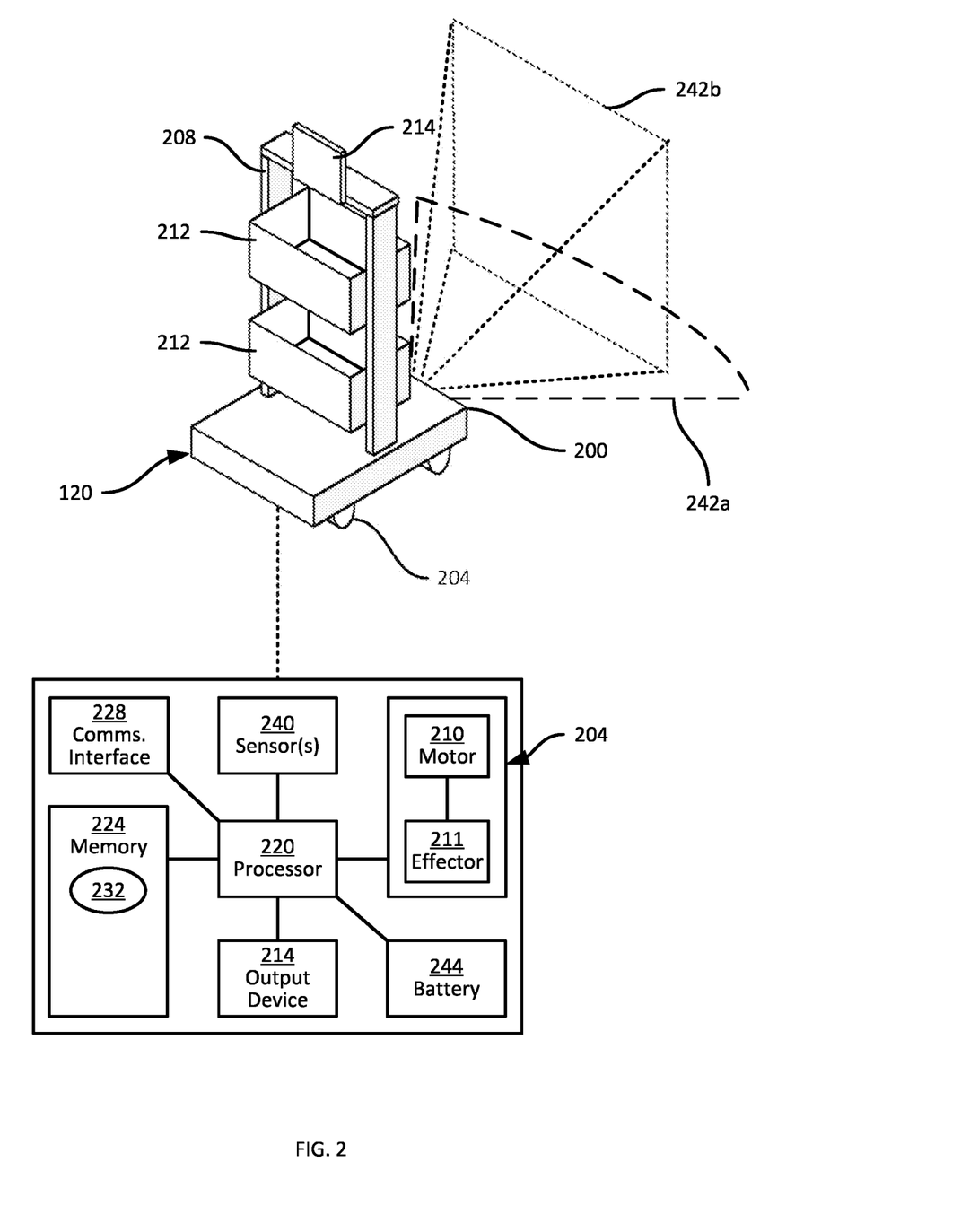
FIG. 2 is a diagram of certain components of a mobile robot of FIG. 1.

Before discussing the functionality implemented by the robots 120 in greater detail, certain components of the robots 120 are discussed with reference to FIG. 2. As shown in FIG. 2, each robot 120 includes a chassis 200 supporting various other components of the robot 120. In particular, the chassis 200 supports a locomotive assembly 204, which can include a motor 210, such as one or more electric motors (e.g., a brushless DC electric motor) driving an effector 211 such as a set of wheels, tracks, or the like. The locomotive assembly 204 can include one or more sensors such as a wheel odometer, an inertial measurement unit (IMU), and the like. The locomotive assembly 204 can further include one or more braking devices, e.g., coupled to the effector(s) 211.

The chassis 200 also supports receptacles, shelves, or the like, to support items 108 during transport. For example, the robot 120 can include a selectable combination of receptacles 212. In the illustrated example, the chassis 200 supports a rack 208, e.g., including rails or other structural features configured to support receptacles 212 at variable heights above the chassis 200. The receptacles 212 can therefore be installed and removed to and from the rack 208, enabling distinct combinations of receptacles 212 to be supported by the robot 120.

The robot 120 can also include an output device, such as a display 214. In the illustrated example, the display 214 is mounted above the rack 208, but it will be apparent that the display 214 can be disposed elsewhere on the robot 120 in other examples. The display 214 can include an integrated touch screen or other input device, in some examples, The robot 120 can also include other output devices in addition to or instead of the display 214. For example, the robot 120 can include one or more speakers, light emitters such as strips of light-emitting diodes (LEDs) along the rack 208, and the like.

The chassis 200 of the robot 120 also supports various other components, including a processor 220, e.g., one or more CPUs, GPUs, or dedicated hardware controllers such as ASICs. The processor 220 is communicatively coupled with a non-transitory computer readable medium such as a memory 224, e.g., a suitable combination of volatile and non-volatile memory elements. The processor 220 is also coupled with a communications interface 228, such as a wireless transceiver enabling the robot 120 to communicate with other computing devices, such as the server 128 and other robots 120.

The memory 224 stores various data used for autonomous or semi-autonomous navigation, including an application 232 executable by the processor 220 to implement navigational and other task execution functions. In some examples, the above functions can be implemented via multiple distinct applications stored in the memory 224.

The chassis 200 can also support a sensor 240, such as one or more cameras and/or depth sensors (e.g., lidars, depth cameras, time-of-flight cameras, or the like) coupled with the processor 220. The sensor(s) 240 are configured to capture image and/or depth data depicting at least a portion of the physical environment of the robot 120. Data captured by the sensor(s) 240 can by used by the processor 220 for navigational purposes, e.g., path planning, obstacle avoidance, and the like, as well as for updating a map of the facility in some examples.

The sensors 240 have respective fields of view (FOVs). For example, a first FOV 242*a* corresponds to a laser scanner, such as a lidar sensor disposed on a forward-facing surface of the chassis 200. The FOV 242*a* can be substantially two-dimensional, e.g., extending forwards in a substantially horizontal plane. A second FOV 242*b* corresponds to a camera (e.g., a depth camera, a color camera, or the like) also mounted on the forward-facing surface of the chassis 200. As will be apparent, a wide variety of other optical sensors can be disposed on the chassis 200 and/or the rack 208, with respective FOVs 242. The components of the robot 120 that consume electrical power can be supplied with such power from a battery 244, e.g., implemented as one or more rechargeable batteries housed in the chassis 200.

Figure 3:
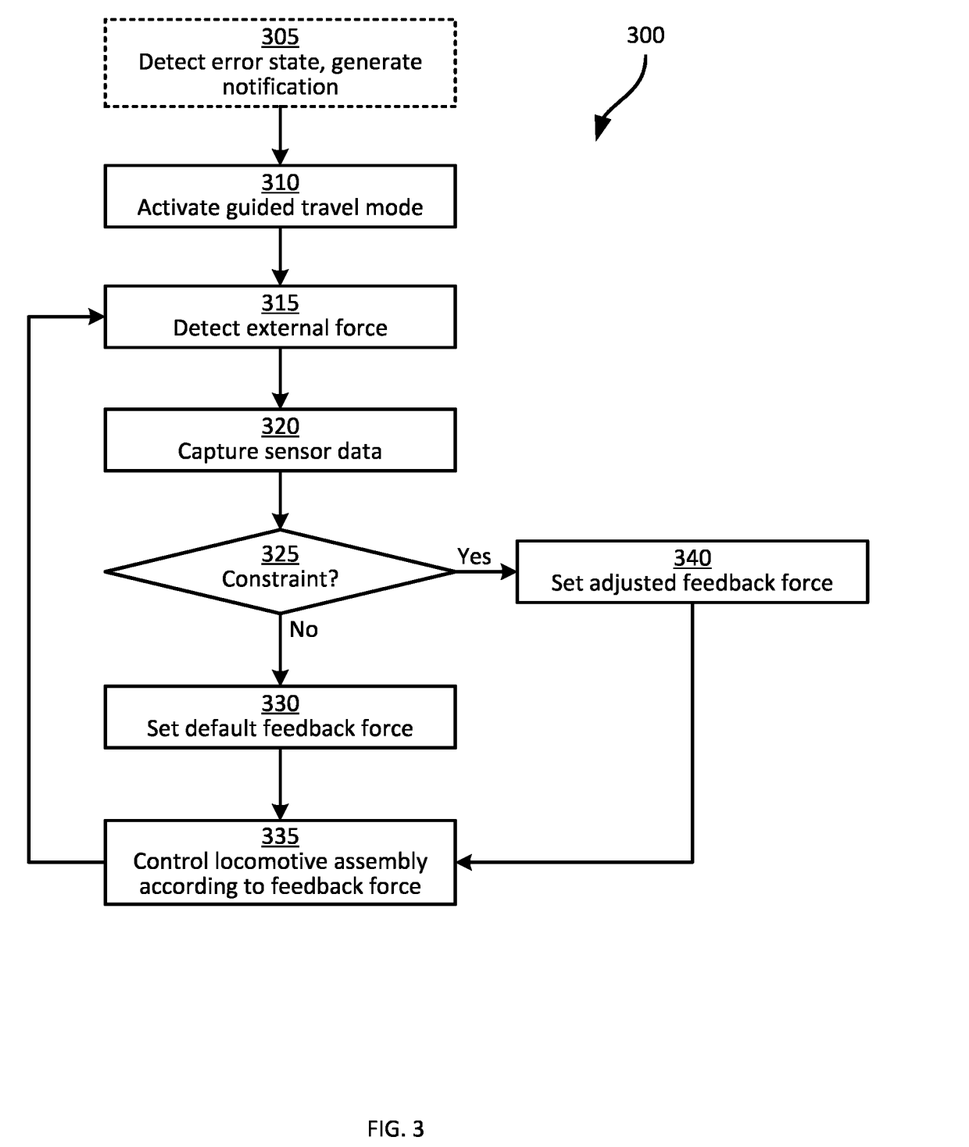
FIG. 3 is a flowchart illustrating a method of dynamic force feedback generation in mobile robots.

Turning to FIG. 3, a method 300 of generating dynamic force feedback in the guided travel mode is illustrated. The method 300 is described below in conjunction with its example performance by a mobile robot 120, e.g., via execution of the application 232 by the processor 220.

At block 305, the robot 120 can be configured to detect an error state, and generate a notification indicating the error state detection. The processor 220 can be configured to detect any of a variety of error states at block 305. For example, detecting the error state can include a determination that a localization confidence, associated with a current pose estimation of the robot 120, is below a threshold indicating that the robot 120 is mislocalized. In other examples, detecting the error state can include a determination that the robot 120 is stuck (e.g., is unable to generate a path from a current pose to a target pose, due to obstacles adjacent to the robot 120 or the like). More generally, the error state detected at block 305 is a state in which the robot 120 is configured to cease autonomous navigation, and await manual assistance by a worker 126.

The processor 220 can control either or both of the display 214 and the communications interface 228 to generate the notification. In some examples, the processor 220 can control the display 214 and/or other output devices as mentioned above to render an indication of the error state (e.g., indicating that the robot 120 is mislocalized and requires manual guidance to a particular area in the facility 100 for relocalization). In other examples, the processor 220 can generate and transmit a message to the server 128, or directly to other robots 120 (e.g., via Bluetooth broadcast), identifying the error state. For example, turning to FIG. 4, an example performance of block 305 is illustrated, in which the robot 120-1 is mislocalized (e.g., localization confidence has fallen below a threshold).

Figure 4:
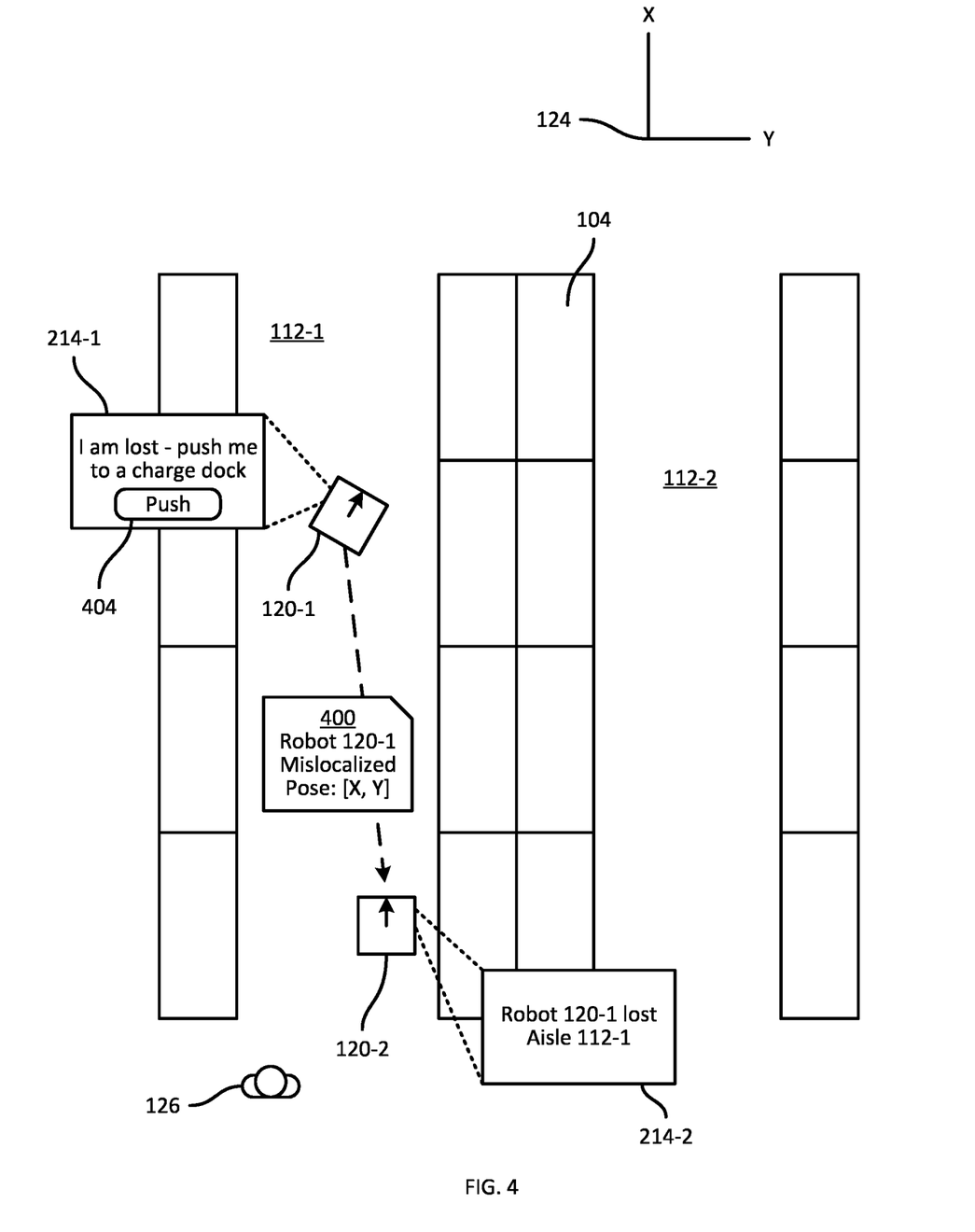
FIG. 4 is a diagram illustrating an example performance of block 305 of the method of FIG. 3.

The robot 120-1 is configured to present, e.g., on the display 214-1, a notification indicating that the robot 120-1 is mislocalized and requires pushing to a charge dock or other portion of the facility 100 for relocalization. As also shown in FIG. 4, the robot 120-1 can transmit a message 400, e.g., by short-range broadcast, to nearby robots 120 (e.g., the robot 120-2). The message 400 indicates that the robot 120-1 is mislocalized, and can also include the current pose of the robot 120-1 (or, in some examples, the most recent pose determined prior to detection that the robot 120-1 is mislocalized). In response to receiving the message 400, the robot 120-2 can present a notification on its display 214-2, informing nearby workers 126 that the robot 120-1 is in an error state and requires manual intervention.

Returning to FIG. 3, at block 310 the robot 120 (the robot 120-1, in this example) is configured to activate a guided travel mode, in which the robot 120-1 ceases autonomous navigation. Specifically, rather than plan paths through the facility 100 and control the locomotive assembly 204 to execute such paths, in the guided travel mode the robot 120-1 awaits an external force applied to the chassis 200, e.g., by the worker 126, and controls the locomotive assembly 204 to provide various levels of force feedback to the worker 126 while the worker 126 pushes the robot 120-1 through the facility 100.

The processor 220 can activate the guided travel mode in response to receiving a command, e.g., via an input device such as the above-mentioned touch screen integrated with the display 214. For example, referring again to FIG. 4, the display 214-1 can present a selectable interface element 404, selection of which by the worker 126 causes the robot 120-1 to activate the guided travel mode. In other examples, the processor 220 can activate the guided travel mode in response to a command received from another computing device, such as the server 128, a mobile computing device operated by the worker 126, or the like. Further, in some examples the activation of the guided travel mode need not be preceded by detection of an error state at block 305. Block 305 is therefore shown in dashed lines in FIG. 3 to indicate that block 305 can be omitted in some embodiments.

At block 315, the processor 220 is configured to detect an external force applied to the chassis in a first direction. The first direction, in this example, matches a forward direction of the robot 120, e.g., in which the sensor FOVs 242 face. The external force can be applied by a worker 126, e.g., via the rack 208 or directly to the chassis 200. The processor 220 can detect the external force at block 315 via one or more load sensors mounted in or on the rack 208, the chassis 200, the locomotive assembly 204, or the like. At block 315, the processor 220 can therefore be configured to detect not only the existence of the external force, but also a magnitude of the external force. The processor 220 is then configured, as discussed below, to select a force feedback level to provide the worker 126 with tactile feedback as the worker 126 pushes the robot 120, and to control the locomotive assembly 204 to provide the selected level of force feedback.

At block 320, the processor 220 is configured to control the sensor(s) 240, and/or any sensors associated with the locomotive assembly 204 (such as the odometer and IMU mentioned above) to capture sensor data corresponding to a physical environment of the robot 120. For example, the sensor data captured at block 320 can include image and/or depth data depicting any objects in the FOVs 242 (that is, in the direction of travel caused by the external force detected at block 315). The sensor data can also include angles of inclination, e.g., indicating whether the robot 120 is traveling on an inclined (i.e., non-horizontal) surface.

At block 325, the processor 220 is configured to process the sensor data captured at block 315 to detect one or more operational constraints in the physical environment of the robot 120. The operational constraints can include obstacles within a threshold distance of the robot 120, such as walls, support structures 104, other workers 126, other robots 120, charging docks, or the like. The operational constraints can also include virtual obstacles, such as keep-out zones defined in a map of the facility 100 maintained in the memory 224. In further examples, the operational constraints can include speed limits, e.g., defined in the above-mentioned map or in other facility attributes stored in the memory 224.

When no operational constraints are detected at block 325, the processor 220 proceeds to block 330, and selects a default or baseline force feedback level to apply against the external force detected at block 315. The processor 220 can arrive at a negative determination at block 325, for example, when no obstacles are detected in the FOVs 242 within a threshold distance of the robot 120 (e.g., five meters, or any other suitable threshold; the threshold need not be static, but can also vary based on a travel speed of the robot 120). As a further example, the determination at block 325 can be negative when a current speed of the robot 120 is below a speed limit by at least a threshold amount (e.g., at least 30% below the speed limit).

The default force feedback level selected at block 330 can be defined in the memory 224, for example as a predetermined force (e.g., 30 N or any other suitable force). The default force feedback level can also be defined as any other suitable control parameter, such as a level of torque to apply to the effector 211 via the motor 210. The feedback force is the target net force to be applied by the robot 120 against the external force detected at block 315 (i.e., in a second direction opposite the first direction of the external force detected at block 315).

Following block 330, the processor 220 proceeds to block 335, and controls the locomotive assembly 204 according to the selected feedback force. When the determination at block 325 is negative, therefore, the feedback force employed at block 335 is the default feedback force. Control of the locomotive assembly 204 does not necessarily involve controlling the motor 210 to apply the feedback force itself, however. Rather, the processor 220 can be configured to determine control parameters for the motor 210 to apply the feedback force against the external force from block 315, compensating for internal resistance (e.g., friction) within the locomotive assembly 204 itself, as well as gravitational force components resulting from travel on inclined surfaces.

Figure 5:
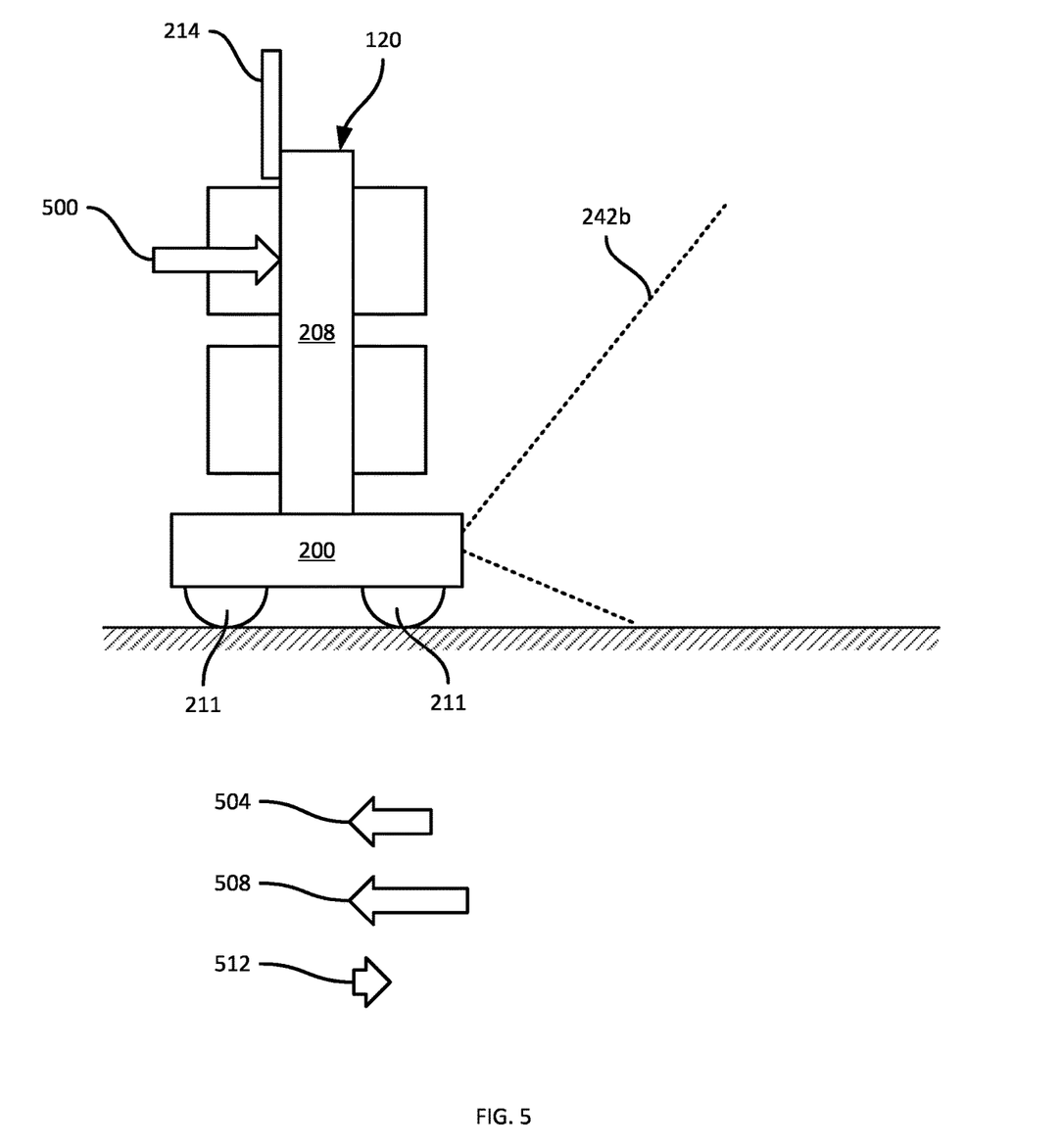
FIG. 5 is a diagram illustrating an example performance of blocks 315 to 335 of the method of FIG. 3.

Turning to FIG. 5, an example performance of blocks 315 to 330 is illustrated. As seen in FIG. 5, an external force 500 is detected, e.g., with a magnitude indicated by a length of the arrow illustrating the force 500. No obstacles are present within the FOV 242b, and the determination at block 325 is therefore negative. At block 330, the processor 220 therefore selects a default feedback force 504, e.g., as predefined in the memory 224. At block 335, the processor 220 is configured to determine a motor force 512 (i.e., a force to be generated by the application of torque to the effectors 211, e.g., via pulse-width modulation control of a DC electric motor) based on the default feedback force from block 330. The motor force 512 can also be based, for example, or internal resistance of the locomotive assembly 204 itself, such as friction within the motor 210 (e.g., if the motor 210 is implemented as a brushed motor). The internal resistance can be determined empirically and stored in the memory 224, either as a static value or as a dynamic model (e.g., in the event that internal resistance varies with speed or other parameters). As seen in FIG. 5, the motor force 512 and the internal resistance 508 sum to the feedback force 504. The motor force 512, in this example, is applied in the same direction as the external force 500.

Referring again to FIG. 3, when the determination at block 325 is affirmative, the processor 220 proceeds to block 340 rather than block 330. At block 340, the processor 220 is configured to select an adjusted feedback force, which may be distinct from the default feedback force at block 330. The adjusted feedback force can, for example, be greater than the default feedback force 504, to provide the worker 126 with sensory feedback indicating the presence of an obstacle or other operational constraint that the worker 126 may not yet be aware of (e.g., because the robot 120 may obscure obstacles from the view of the worker 126).

Figure 6:
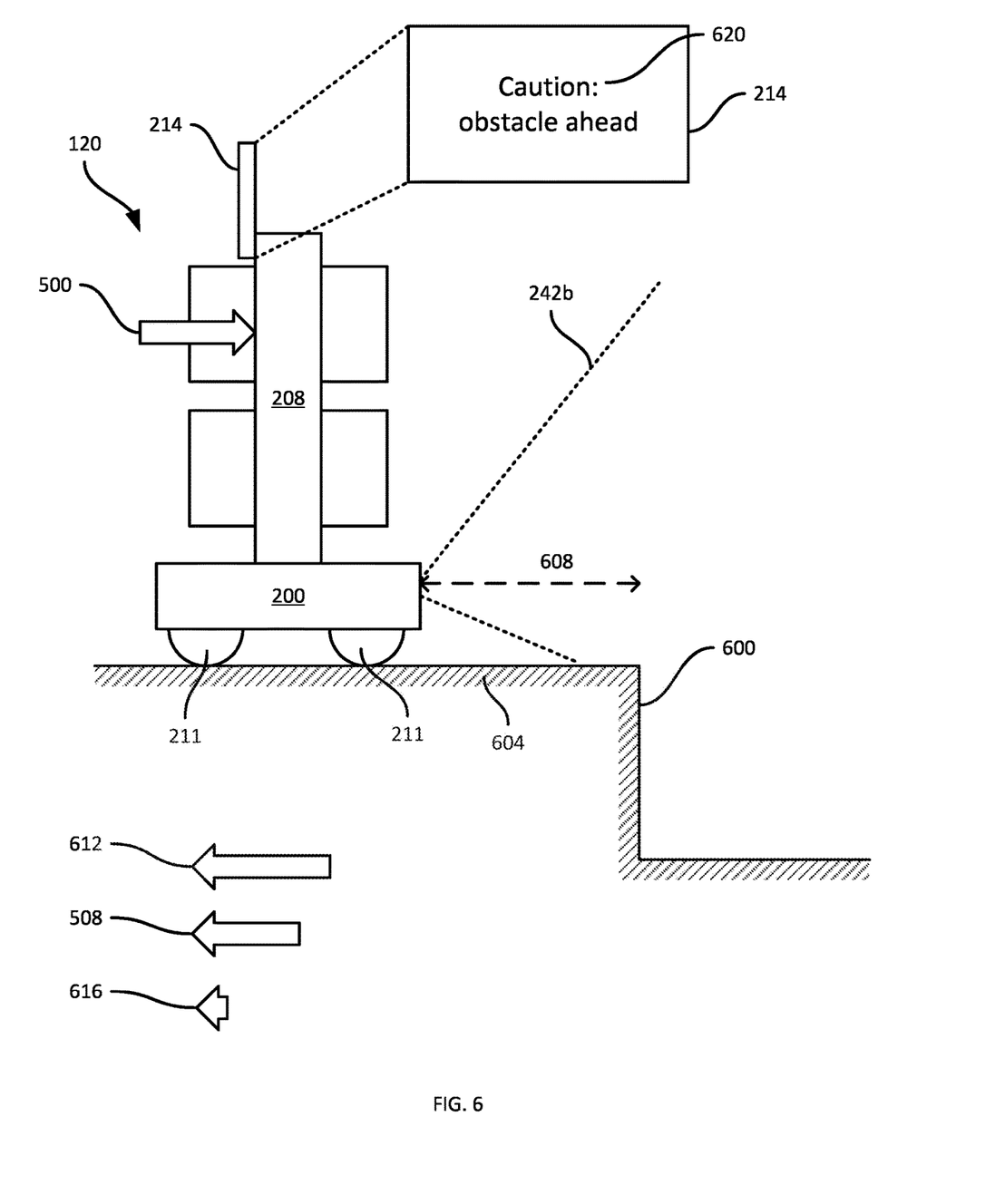
FIG. 6 is a diagram illustrating an example performance of blocks 315 to 340 of the method of FIG. 3.

Having selected an adjusted feedback force, the processor 220 is configured to control the locomotive assembly 204 at block 335 to apply the adjusted feedback force, e.g., net of internal resistance within the locomotive assembly 204. Turning to FIG. 6, a further example is shown in which the robot 120 approaches a drop 600 in a floor 604 of the facility 100, formed by stairs, a loading dock, or the like. The drop 600 is within the FOV 242b of an image and/or depth sensor 240 of the robot 120. At block 325, the processor 220 an be configured to determine whether a distance 608 between the robot 120 and the drop 600 (or any other obstacle, as will be apparent) is below a predetermined threshold. When the determination is affirmative, the processor 220 proceeds to block 340. The adjusted feedback force selected at block 340 can be incremented from the default feedback force 504, e.g., by a factor or amount inversely proportional to the distance 608. That is, the adjusted feedback force can increase as the distance 608 decreases.

In the example of FIG. 6, the adjusted feedback force 612 selected at block 340 is greater than the default feedback force 504 shown in FIG. 5. At block 335, the processor 220 is configured to select a motor force 616 based on the feedback force 612 and the internal resistance 508 mentioned above. As illustrated, the motor force 616 is in an opposite direction from the external force 500, and sums with the internal resistance 508 to produce the feedback force 612.

At block 335, the processor 220 can also be configured to present a notification 620, e.g., via the display 214, speaker, or other suitable output device, indicating that an obstacle has been detected. More generally, the notification 620 can indicate a reason for the application of the adjusted feedback force 612, rather than the default feedback force 504.

As noted above, the selection of an adjusted feedback force at block 340 can be based on parameters other than a distance to an obstacle, such as the distance 608. In some examples, the adjusted feedback force can be selected according to a difference between a speed limit and a current speed of the robot 120, e.g., by increasing the default feedback force in inverse proportion to the difference between the current speed and the speed limit.

Figure 7:
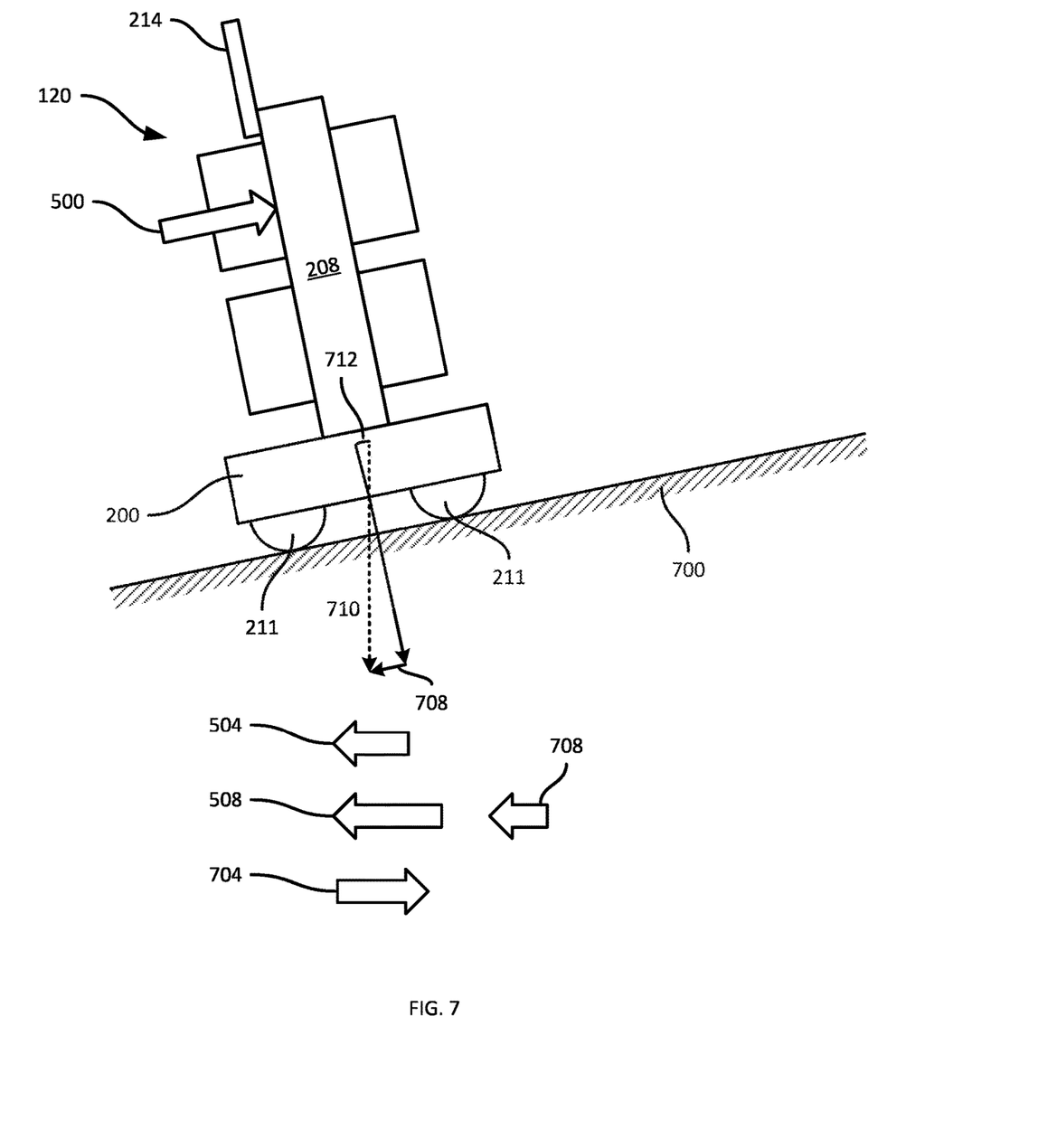
FIG. 7 is a diagram illustrating another example performance of blocks 315 to 335 of the method of FIG. 3.

Turning to FIG. 7, the selection of feedback forces and resulting motor forces can also account for travel on inclined surfaces. For example, FIG. 7 illustrates the robot 120 travelling up an inclined surface 700. In response to detection of the external force 500, the processor 220 can select the default feedback force 504, and determine a motor force 704 based not only on the internal resistance 508, but also on a component 708 of a gravitational force corresponding to the weight of the robot 120 (the component 708 being the component of a gravitational vector 710, e.g., sensed by an IMU of the robot 120) that is parallel to the surface 700). The component 708 can be determined by the processor 220 based on sensor data captured via the IMU indicating a tilt angle 712 of the robot 120, e.g., an angle between the rack 208 and the gravitational vector 710. The tilt angle 712 of the robot 120 can result from an angle of inclination of the surface 700 relative to horizontal. In some examples, the tilt angle 712 of the robot 120 can result not only from travel on an inclined surface, but also from tilt resulting from the force 500 itself.

The motor force 704, as seen in comparison to FIG. 5, is greater than the motor force 512 to provide the same net feedback force 504. As will be apparent, in the event that the robot 120 is descending an inclined surface rather than ascending, the motor force may be smaller in the same direction as shown in FIG. 7, or in the opposite direction depending on the slope of the incline. In further examples, the presence of an inclined surface or, more generally, a non-zero tilt angle of the robot 120, can be considered an operational constraint at block 325, and the processor 220 can therefore select an adjusted feedback force, e.g., increasing the feedback force relative to default proportionally to the tilt angle 712 and/or the angle of inclination of the surface 700.

Following the performance of block 335, the processor 220 is configured to return to block 315. The performance of blocks 315 to 335 can be repeated at a suitable frequency to provide substantially real-time detection of external force and application of varying feedback forces (e.g., at a frequency of about 30 Hz, in some examples).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile robot, comprising:
a chassis supporting a locomotive assembly;
a sensor;
a processor configured, in a guided travel mode, to:
  detect an external force applied to the chassis in a first direction;
  control the sensor to capture sensor data;
  detect, based on the sensor data, an operational constraint;
  determine, based on the detected operational constraint, a control parameter for generating a feedback force in a second direction opposite the first direction; and
  controlling the locomotive assembly according to the control parameter;
  wherein the processor is configured to determine a motor force based on the feedback force and an internal resistance of the locomotive assembly.

2. The mobile robot of claim 1, wherein the processor is further configured, prior to detecting the external force, to:
detect an error state;
in response to detecting the error state, generate an error state notification;
in response to the error state notification, receive a guided travel command; and
activate the guided travel mode in response to the guided travel command, the guided travel command configuring the mobile robot to receive the external force to push the mobile robot in the first direction.

3. The mobile robot of claim 2, wherein the processor is configured to detect the error state by detecting that the mobile robot is at least one of mislocalized and stuck.

4. The mobile robot of claim 1, wherein the locomotive assembly includes a motor; and
 wherein the processor is further configured to control the locomotive assembly by:
  controlling the motor to generate the motor force.
5. The mobile robot of claim 1, wherein the processor is configured to:
 detect, from the sensor data, that the chassis is on an incline; and
 determine the motor force further based on a component of a gravitational force parallel to the incline.
6. The mobile robot of claim 1, wherein the sensor includes an optical sensor having a field of view facing the first direction; and
 wherein the processor is configured to detect the operational constraint by:
  detecting an obstacle in the sensor data; and
  determining that a distance from the mobile robot to the obstacle is below a threshold distance.
7. The mobile robot of claim 6, wherein the processor is configured to determine the feedback force by adjusting a default feedback force based on the distance.
8. The mobile robot of claim 1, wherein the processor is configured to detect the operational constraint by:
 determining a travel speed of the chassis from the sensor data; and
 comparing the determined speed to a speed limit.
9. The mobile robot of claim 8, wherein the processor is configured to determine the feedback force by:
 adjusting a default feedback force based on a difference between the determined speed and the speed limit.
10. The mobile robot of claim 1, further comprising: an output device;
 wherein the processor is further configured to control the output device to present a notification corresponding to the feedback force.
11. A method, comprising:
 detecting an external force applied to a chassis of a mobile robot in a first direction;
 controlling a sensor of the mobile robot to capture sensor data;
 detecting, based on the sensor data, an operational constraint;
 determining, based on the detected operational constraint, a control parameter for generating a feedback force in a second direction opposite the first direction;
 controlling a locomotive assembly of the mobile robot according to the control parameter; and
 determining a motor force based on the feedback force and an internal resistance of the locomotive assembly.
12. The method of claim 11, further comprising, prior to detecting the external force:
 detecting an error state;
 in response to detecting the error state, generating an error state notification;
 in response to the error state notification, receiving a guided travel command; and
 activating the guided travel mode in response to the guided travel command, the guided travel command configuring the mobile robot to receive the external force to push the mobile robot in the first direction.
13. The method of claim 12, wherein detecting an error state includes detecting that the mobile robot is at least one of mislocalized and stuck.
14. The method of claim 11, wherein controlling the locomotive assembly includes:
 controlling a motor of the locomotive assembly to generate the motor force.
15. The method of claim 11, further comprising:
 detecting, from the sensor data, that the chassis is on an incline; and
 determining the motor force further based on a component of a gravitational force parallel to the incline.
16. The method of claim 11, wherein the sensor includes an optical sensor having a field of view facing the first direction; and wherein detecting the operational constraint includes:
 detecting an obstacle in the sensor data; and
 determining that a distance from the mobile robot to the obstacle is below a threshold distance.
17. The method of claim 16, wherein determining the feedback force includes adjusting a default feedback force based on the distance.
18. The method of claim 11, wherein detecting the operational constraint includes:
 determining a travel speed of the chassis from the sensor data; and
 comparing the determined speed to a speed limit.
19. The method of claim 18, wherein determining the feedback force includes:
 adjusting a default feedback force based on a difference between the determined speed and the speed limit.
20. The method of claim 11, further comprising: controlling an output device of the mobile robot to present a notification corresponding to the feedback force.

* * * * *